(12) United States Patent
Burr

(10) Patent No.: US 6,910,666 B2
(45) Date of Patent: Jun. 28, 2005

(54) ADJUSTABLE LEVELING MOUNT

(76) Inventor: William J. Burr, 400 S. Evergreen, Bensenville, IL (US) 60106

(*) Notice: Subject to any disclaimer, the term of this patent is extended or adjusted under 35 U.S.C. 154(b) by 26 days.

(21) Appl. No.: 10/822,532

(22) Filed: Apr. 12, 2004

(65) Prior Publication Data

US 2004/0262467 A1    Dec. 30, 2004

Related U.S. Application Data

(63) Continuation-in-part of application No. 09/975,906, filed on Oct. 12, 2001, now Pat. No. 6,520,459, and a continuation-in-part of application No. 10/352,821, filed on Jan. 28, 2003, now Pat. No. 6,742,750.

(51) Int. Cl.[7] ............................................. F16M 11/24
(52) U.S. Cl. .............................. 248/188.4; 248/188.2; 248/188.8
(58) Field of Search .................... 248/188.8, 188.9, 248/188.2, 188.4, 188.7, 677

(56) References Cited

U.S. PATENT DOCUMENTS

| | | | |
|---|---|---|---|
| 842,641 A * | 1/1907 | Fernau | 248/188.4 |
| 1,638,725 A * | 8/1927 | Chesnutt | 16/42 R |
| 1,852,751 A * | 4/1932 | Johnson | 182/109 |
| 1,886,112 A * | 11/1932 | Luarde | 248/188.4 |
| 2,327,050 A * | 8/1943 | Kotler | 248/188.4 |
| 2,403,338 A * | 7/1946 | Butler | 108/64 |
| 3,000,041 A * | 9/1961 | Reynolds | 16/42 R |
| 3,815,852 A | 6/1974 | May | |
| 3,845,924 A * | 11/1974 | Taviere et al. | 248/544 |
| 4,015,808 A * | 4/1977 | Carroll | 248/188.4 |
| 4,061,298 A * | 12/1977 | Kober | 248/677 |
| 4,632,356 A | 12/1986 | Munz | |
| 4,766,976 A * | 8/1988 | Wallick, Jr. | 182/201 |
| 5,104,075 A | 4/1992 | Freeman | |
| 5,148,892 A * | 9/1992 | Lu | 182/201 |
| 5,632,689 A * | 5/1997 | Duca | 473/279 |
| 5,782,444 A * | 7/1998 | Anderman et al. | 248/188.8 |

(Continued)

Primary Examiner—Leslie A. Braun
Assistant Examiner—A. Joseph Wujciak
(74) Attorney, Agent, or Firm—Levenfeld Pearlstein; Leon I. Edelson; William C. Clarke

(57) ABSTRACT

A leveling mount is disclosed for equipment in temporary or permanent installations wherein the supporting surface can be a non-level planar surface. A ball and socket support stud provides a self-leveling adjustment of support. An elastomeric removable mount base pad provides non-skid means. Swivel and radial movement of the ball and socket support stud are maintained to about 15° from the vertical and 360° rotary movement of the leveling mount base. The leveling mount base can engage a threaded support stud affixed to the supported equipment. A suitable number of lag holes with knock-out covers over said lag holes are provided. The lag holes are in perpendicular alignment with parallel top and bottom configured surfaces of the leveling mount base to permit secure attachment of the leveling mount base to support surfaces to reduce to a minimum the presence of open holes, crevices, recesses and cavities in the juncture of the leveling device with the support surface. Additionally, the surface design of the leveling device base element is configured to present a clean unencumbered surface for cleaning procedures after the leveling device is secured in place by employment of securing elements including bolts, screws and washers.

12 Claims, 7 Drawing Sheets

U.S. PATENT DOCUMENTS

| | | |
|---|---|---|
| 5,794,912 A | 8/1998 | Whittaker et al. |
| 5,842,678 A * | 12/1998 | Svejkovsky ................. 248/650 |
| 5,881,979 A * | 3/1999 | Rozier et al. ............ 248/188.5 |
| 6,138,979 A * | 10/2000 | Morman ..................... 248/638 |
| 6,520,459 B2 * | 2/2003 | Burr ......................... 248/188.4 |
| 6,742,750 B2 * | 6/2004 | Burr ......................... 248/188.4 |
| 2001/0019096 A1 | 9/2001 | Andreoli et al. |

* cited by examiner

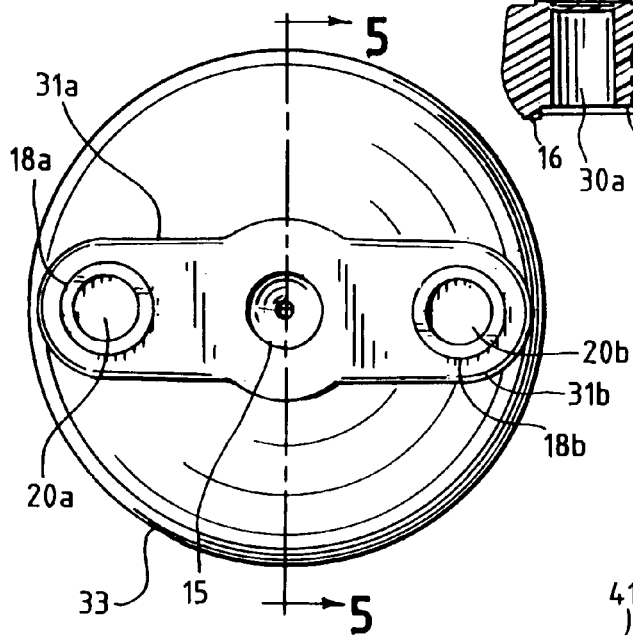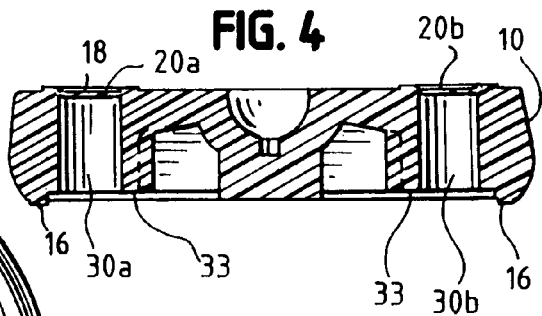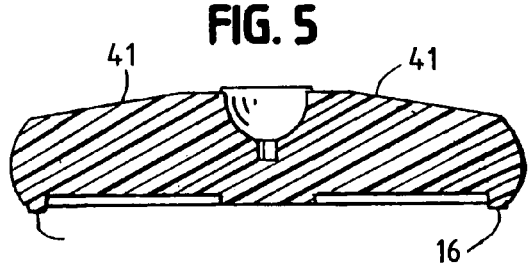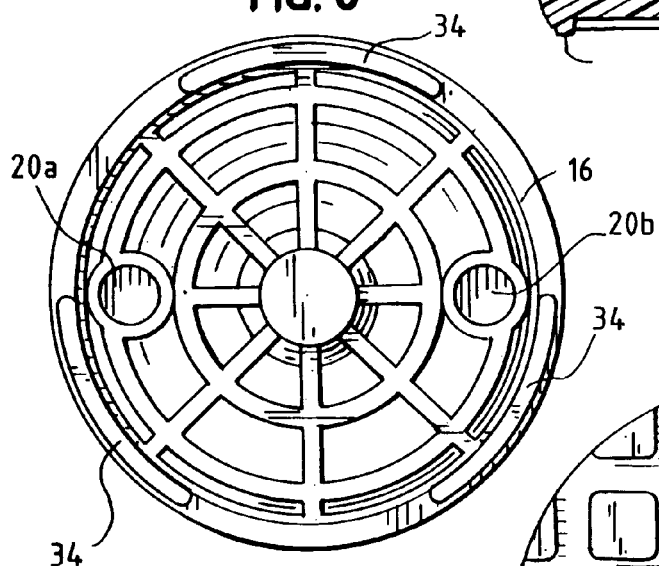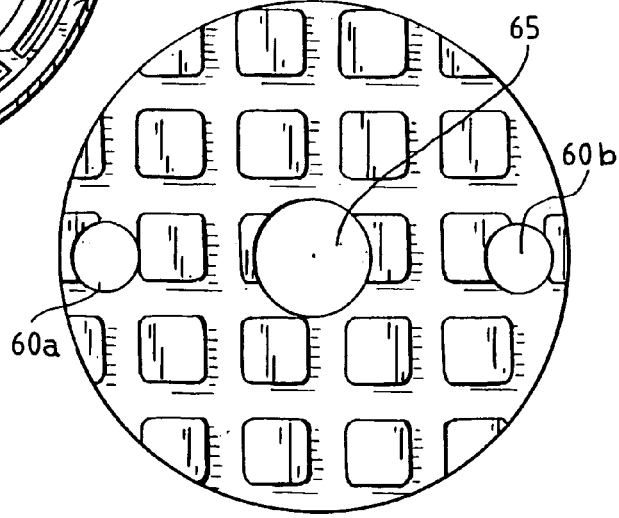

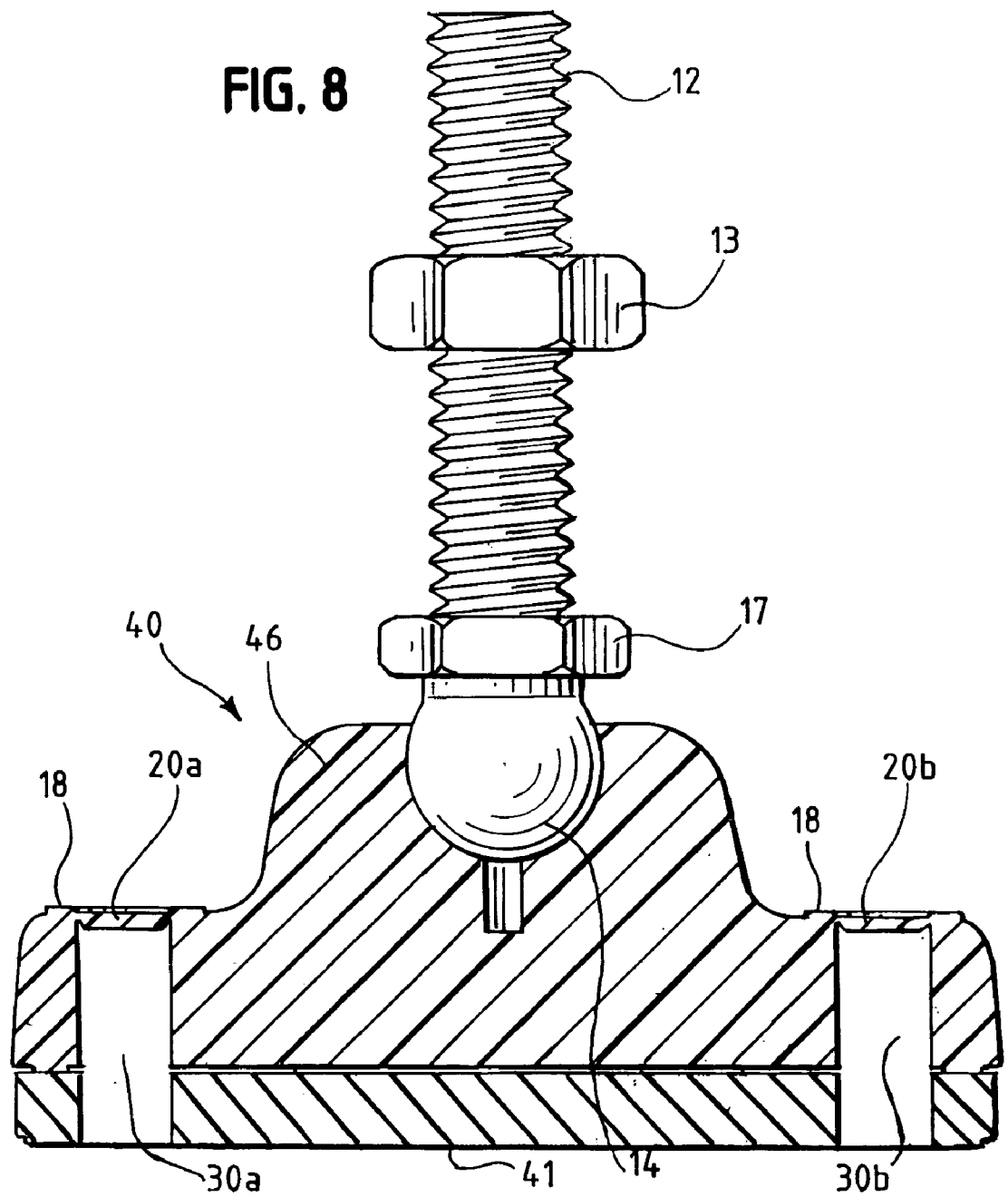

ADJUSTABLE LEVELING MOUNT

CROSS REFERENCE TO RELATED APPLICATIONS

This application is a continuation-in-part of Ser. No. 09/975,906 filed Oct. 12, 2001, now U.S. Pat. No. 6,520,459, issued Feb. 18, 2003, and Ser. No. 10/352,821 filed Jan. 28, 2003 now U.S. Pat. No. 6,742,750.

FIELD OF THE INVENTION

The field of this invention relates to equipment leveling devices. The present invention is a device to permit installation of equipment in temporary or permanent locations wherein the supporting surface may not be a level planar surface. Leveling elements are accordingly required to supply adjustable support for the equipment to overcome the uneven support surface in order for the equipment to be leveled despite the non-planar support surface. The present invention is also adapted to permit the equipment to be repositioned or moved to uneven surfaces without loss of stability upon an uneven or non-level surface in non-skid applications.

The term "non-skid" refers to the substantial anchoring of equipment in a specific location upon what can be described as a non-planar surface so that the equipment does not move from its designated position during operation despite vibratory or oscillatory movement of the equipment. The present invention accordingly is a unique leveling mount to be installed on a wide variety of operating equipment including machine tools, packaging and printing machines and other machines performing a wide range of operations.

In the utilization of a leveling device to permit installation of equipment in temporary or permanent locations, if the leveling device is to anchor the equipment to the selected location, a suitable means of attachment to the support surface is required. The means of attachment can comprise bolts inserted through holes through the body of the leveling device which allows the leveling device and the supported equipment to be secured in place. However, the presence of these holes, and related crevices, cavities, and indentations of what otherwise would be a smooth surface presents an opportunity for the buildup of dirt and dirt accumulations and for bacteria traps. The present invented leveling device is therefore adapted to permit the secure attachment of the leveling device to the support surface, if such is required, and to reduce to a minimum the presence of open holes, crevices, recesses, and cavities in the juncture of the leveling device with the support surface which could harbor dirt and bacteria. Additionally, the surface design of the leveling device base element is configured to present a clean and unencumbered surface for sanitary cleaning procedures after the leveling device is secured in place by employment of securing elements such as bolts, screws and washers.

The present invention is therefore an equipment leveling device to permit installation of equipment in temporary or permanent locations wherein the support surface may not be a level planar surface and sanitary requirements are such that the presence of holes, crevices, recesses, and cavities which could form traps for dirt and bacteria can constitute a problem. This situation is undesirable in locations where the leveling devices are used as support structures for equipment in industries such as food processing and pharmaceuticals.

BACKGROUND OF THE INVENTION

Many types of leveling devices utilize a simple screw-jack consisting of a bolt that provides a means of raising or lowering the device, the bolt threaded directly into the leveling mount. The use of a bolt as a load bearing leg for the support of machinery can pose difficulties if the machine is to be placed upon a surface that tilts or requires the machine be in a fixed position perpendicular to the support surface. The tilt of the supporting bolt can cause a resulting stress upon the bolt, which results in the failure of the bolt. U.S. Pat. No. 5,104,075 to Freeman discloses a machine leveling assembly, which employs a screw-jack mechanism with a ball and socket support and load transmission member comprising a threaded metal shaft mounted vertically in a leveling assembly. The shaft terminates in a ball, which is inserted into a separate ground support base configured to allow the ball and leveling assembly to rotate freely and allow the load to be distributed more evenly about the spherical surface of the socket.

The use of a threaded screw or spindle to adjust the vertical support of a mounting device in conjunction with motion resistant and shock-absorbing members is taught in prior art. U.S. Pat. No. 3,815,852 to May discloses a machine mount device, which has a special friction surface for resting upon a floor to resist lateral motion displacement. The friction surface consists of a metal layer to which is brazed a quantity of carbide grits so that with motion of the machine mount, the grits tend to work into the floor surface to hold the supported machine in a fixed position. The vertical machine support, a threaded leveling bolt, is threaded through a lock nut to retain the machine support in place to support the machine. The machine mount device further comprises a well-like box which contains two resilient cylindrical bodies which are resiliently engaged against the sides of the box to secure the opening between the motion-limiting element and the sides of the box, and, potentially provide against accumulation of dirt. U.S. Pat. No. 4,632,356 to Munz discloses a mounting device comprising a foundation body of a resilient material of rubber or other suitable elastomer with a metal cover plate into which is rotated a threaded spindle to adjust the vertical support of the supported object. A retaining ledge on the supported object holds the supported object against rotation during rotation of the threaded spindle. In one embodiment, a threaded bolt of the support plate is screwed into an internal thread of a double spindle with a threaded bushing. To protect the screw threads against dirt, a deformable protective sleeve can be utilized. U.S. Pat. No. 5,794,912 to Whittaker discloses a vibration isolation mount comprising an elastomeric material within an enclosing metal frame, the metal frame being open on the bottom to the supporting surface, thus permitting the accumulation of dirt within the metal frame. An adjustable threaded screw through the metal frame rests upon a steel plate inserted into a recess within the elastomeric material and thus can raise and lower heavy equipment support surface. The elastomeric material is configured so the elastomeric material contacts the support surface thus dampening and isolating horizontal vibrations imposed on the mount from the supported equipment.

U.S. patent application Publication 2001/0019096 to Andreoli discloses a support foot for supporting operating machines used in plants for processing or production of food products which comprises a covering element in the form of a removable cap, which can be of metal or of plastic. The cap prevents infiltration of liquid into the base of the support foot. The cap snap-engages around the foot base. The central hole of the cap is equal in diameter to the diameter of the hemispherical seat of the hemisphere end of the foot stem which joins the foot to the supported machine. Holes in the base permit insertion of screws to secure the support foot to a support surface, the removable cap covering the screw holes.

It thus is well known to use a threaded support to raise and lower a supported object as a mounting device and leveling agent. However, objectionable aspects of devices ordinarily available as equipment leveling devices can restrict the utility of such devices and may create problems in their application and use. A disadvantage of the mounting device taught by Freeman '075 is that the ball and socket arrangement is not self-leveling. While the arrangement permits the leveling assembly to rotate freely and the load to be evenly distributed about the spherical surface of the socket, the ball is not free to move from the vertical to adjust for unevenness of the supporting surface during installation of the machine-leveling device. The Freeman '075 machine-leveling device also utilizes the practice of inserting load-bearing shims precision ground to fit. As Freeman '075 teaches, shims can be difficult to use if the machine is to be placed on a surface that varies in elevation between different mount locations. The May '852 patent discloses a vertical supporting element on a base with carbide grits which frictionally engage and cut into softer floor materials and work into the floor. The machine mount apparatus of the May '852 patent and the supported machine are not free to be easily moved after engagement with the supporting floor even though the machine mount potentially provides against accumulation of dirt by provision of resilient bodies which secure openings of the well-like box. The Munz '356 patent requires that the particular object to be supported must be provided with engaging surfaces which in conjunction with a protruding ledge of the mount device engages and retains the object in position against rotation of the mounting device support upon rotation of a threaded spindle to adjust the spacing between the object and the supporting surface. Moreover, the Munz patent indicates that deviations from vertical alignment require compensating adjustments in the design of the mounting device to provide an adjustable mounting device for the required application instead of being initially a self-leveling mounting device. A separate deformable protective sleeve is utilized to protect against dirt. The Whittaker patent '912 discloses an elastomeric material within a metal frame, which contacts a supporting surface such as a floor or other structure, the metal frame being open on the bottom, permitting entry of dirt. Function of the elastomeric material is as a vibration isolation mass and a support for heavy-duty dynamic equipment such as stamping presses, machine tools and the like. The elastomeric material is taught as having a flat lower surface in contact with the supporting surface and is inserted within the metal frame. The elastomeric material insert is shaped and dimensioned to fit snugly within the metal frame in that the sides of the frame engage the sides of the elastomeric insert. The weight of the supported equipment maintains the positioning of the insert within the frame. No provision by Whitaker '912 is provided for easy replacement for the elastomeric insert if such is required by usage or for self-leveling of the mounting device. The Andreoli publication '096 requires a separate cap to be inserted over the securing elements of the support foot, the cap snap-engaging the base to provide a tight seal. The cap of metal or plastic material can be deformed under pressure to break the seal.

Accordingly, it is an object of the instant invention to provide a leveling mount, which provides a self-leveling ball and socket arrangement and self-leveling means of supporting a structure wherein the support surface may not be a level planar surface wherein the leveling mount provides a means of securing the leveling mount to the support surface and to reduce to a minimum the presence of open holes, recesses, cavities in the juncture of the leveling mount with the support surfaces which could result in the buildup and accumulation of dirt and bacteria.

Another object of the instant invention is to provide a leveling mount which provides a self-leveling ball and socket arrangement and a self-leveling means of supporting a structure wherein the support surface may not be a level planar surface wherein the leveling mount base design is configured to permit the secure attachment of the leveling mount to the support surface with minimum presence of open holes, crevices, recesses, and cavities on the surface of the leveling mount base and in the juncture of the leveling mount base with the support surface.

Another object of the instant invention is to provide a leveling mount comprising a ball and socket joint with a full range of rotary motion and swivel motion from the vertical wherein the leveling mount base is provided with removable knock-out covers over lag holes.

Another object of the invention is to provide a leveling mount with raised platform shoulders over lag holes of the leveling mount base wherein the raised platform shoulders comprise knock-out covers over said lag holes and provide a clear unencumbered surface with minimum presence of open holes, recesses, cavities, crevices and obstructions to harbor dirt and bacteria.

Another object of the invention is to provide a leveling mount with raised platform shoulders wherein the raised platform shoulder surface with knock-out covers over lag holes is parallel with the base surface of the leveling mount and is parallel with the uneven support surface, thus facilitating the avoidance of significant recesses, cavities, and openings in the juncture between the leveling mount base and the support surface.

Another object of the instant invention is to provide a leveling mount base wherein the leveling mount top surface is in parallel alignment with the leveling mount base whereby bolts and screws with washers inserted through lag holes by removal of knock-out covers permit secure attachment of the leveling mount to the support surface and the bolt and screw heads atop washers present a minimum obstruction to sanitary cleaning procedures and hence reduce opportunity for buildup of dirt and of dirt accumulations, and of bacteria traps.

Another object of the invention is to provide an equipment mount assembly in which the vertical support elements are effectively combined with an elastomeric non-skid base pad to provide efficient mounting of equipment and to restrict appreciable displacement along the surface of the support and damage to the support surface.

A further object of the invention is to provide an efficient means of replacing or resurfacing the elastomeric non-skid base pad by providing a removable male circumferential resurfacing locking elastomeric pad which locks in place as a lock-in place pad for easy placement inside the male perimeter of the base mount and male projections on the pad lock-in-place within female circumferential indentations between multiple perimeter projecting support studs on the leveling mount base with removability, and provides resurfacing replacement after wear or damage.

A still further object is to permit engineering of the elastomeric base pad to required needs of the installation, to modify the thickness, size, and material of the base pad as needed to provide a larger base pad to reduce vibration effects upon the mounted equipment or support surface or to overcome environmental conditions.

An additional object is to provide an equipment mount assembly with design flexibility comprising a ball socket suitable for receiving a ball insert or a fixed stud on equipment, wherein the leveling mount needs to be easily removed to a desired location, a larger than standard stud can be mounted in the leveling mount base or the mounted equipment already has a fixed stud which needs to be inserted in the leveling mount base.

BRIEF SUMMARY OF THE INVENTION

This invention relates to a self-adjusting leveling mount for installation of equipment in locations wherein the supporting surface may not be a level planar surface. The invention comprises a ball and socket arrangement and self-leveling mount which adjusts to uneven surfaces without operative adjustments, a non-skid elastomeric base pad to restrict the movement of the equipment from its designated position during operation despite vibratory or oscillatory movement of the equipment and covering elements of lag holes comprising knock-out covers removably separated from the leveling mount base surface which permit the leveling mount base to be optionally secured to the support surface, avoids the presence of open holes, crevices, recesses and cavities on the surface of the leveling mount base, and facilitates a minimum obstruction means of attachment to a support surface for sanitary cleaning procedures. The non-skid elastomeric base pad utilizes male-female design elements and allows replacement or resurfacing upon damage, wear, or installation requirements. The non-skid elastomeric base pad permits the equipment to be temporarily repositioned or moved to uneven surfaces without damage to the support surface. The mount alternatively comprises a ball socket suitable for receiving a separately sized ball end stud, or an equipment stud, said separately sized ball end stud or an equipment stud being integral supports of supported equipment.

BRIEF DESCRIPTION OF THE DRAWINGS

FIG. 3 is a top view of the socket non-skid leveling mount base of FIG. 1 showing the circumscribed shoulders 31a and 31b and the two knock-out covers 20a and 20b located on the circumscribed shoulders 31a and 31b, the two knock-out covers indented below the surface of the circumscribed shoulders 31a and 31b, and the circumferential flanges-18a and 18b around the knock-out covers.

FIG. 4 is a cross-sectional view of the ball socket non-skid leveling mount base of the circumscribed shoulders of the plane along A—A of FIG. 3.

FIG. 5 is a cross-sectional view of the ball socket non-skid leveling mount base of the ball socket with respect to the decreasing height above the leveling mount base along plane B—B of FIG. 3.

FIG. 6 is a bottom view of the leveling mount base of FIG. 1 showing the male circumferential projection 16 of the base mount which engages the female circumferential sides of the plastic base pad.

FIG. 7 is the bottom view of the base pad suitable for adhesive attachment of the base pad to the base mount of FIG. 1 showing openings 60 for lag holes and the center opening 65 for the center support element of the base mount.

FIG. 8 is a cross-sectional view of an alternative ball socket non-skid leveling mount base 40 with a threaded support stud in the ball socket of the present invention wherein the leveling mount base upper surface is parallel to the leveling mount base surface and the ball socket is positioned within a circumferential housing projection 46 above the leveling mount base upper surface of the leveling mount base 40.

Figure 1:
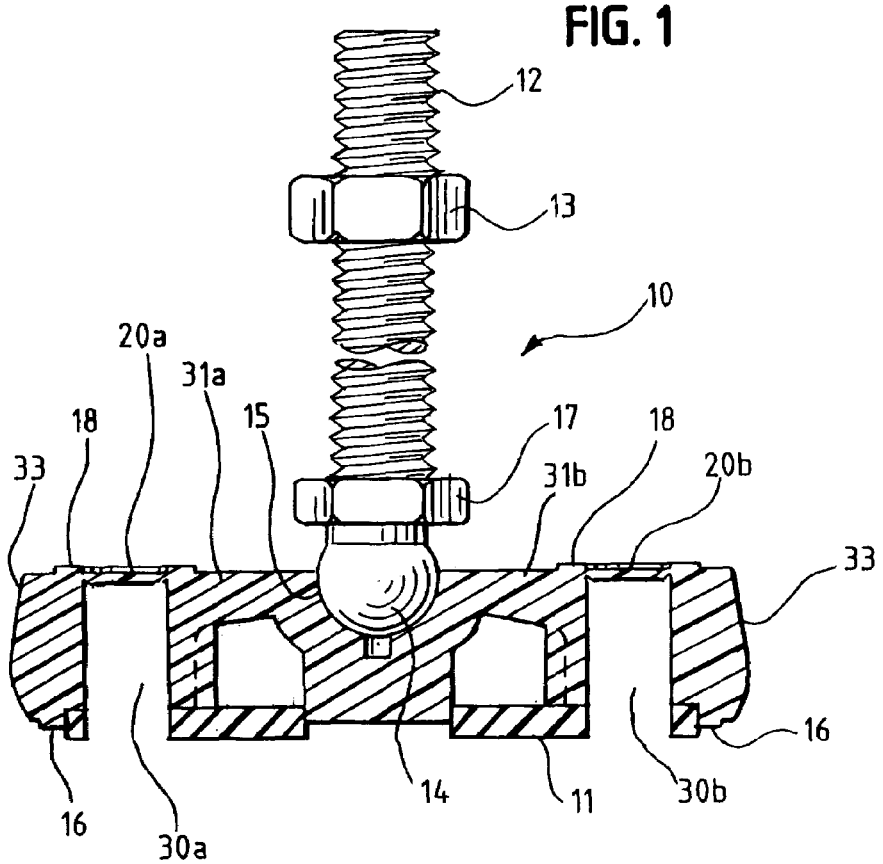
FIG. 1 is a cross-sectional view of the ball socket non-skid leveling mount with a threaded support stud in the ball socket of the present invention wherein the raised platform shoulder is shown as the view of cross-section plane indicated by A—A of FIG. 3 and FIG. 4.

Upon inspection of FIG. 1, it will be noted that the cross-sectional view of plane A—A of FIG. 3 of the leveling mount comprises plastic base mount 10 with raised circumscribed shoulders 31a and 31b, a non-skid elastomeric base pad 11, a threaded stud 12 with a jam nut 13 and a ball ended support member 14, an indented socket 15 in plastic base mount 10, a male circumferential base projection 16 of the rounded circumferential sides 33 in plastic base mount 10 to position the non-skid elastomeric base pad 11 in suitable alignment with the lag holes 30(a–b). Knock-out covers 20(a–b) are level with the surface of the raised platform shoulder of the plastic base mount 10 and have a measurable circumferential flange 18 for guiding removal of knock-out covers 20(a–b). Threaded stud 12 has a milled hexangular-projecting block 17 to allow threaded stud 12 to be screwed or turned into a required position. It will also be noted that elastomeric base pad 11 has suitable openings consistent with the lag holes to permit a suitable means of attachment of the leveling mount to a support surface and a center opening for the center support element of the base mount. The means of attachment can be machine bolts or screws, the heads of which are tightened upon flat washers on the surface of the leveling mount base to cover the lag holes and to provide a hole-and-crevice free surface on the leveling mount base surface.

Figure 2:
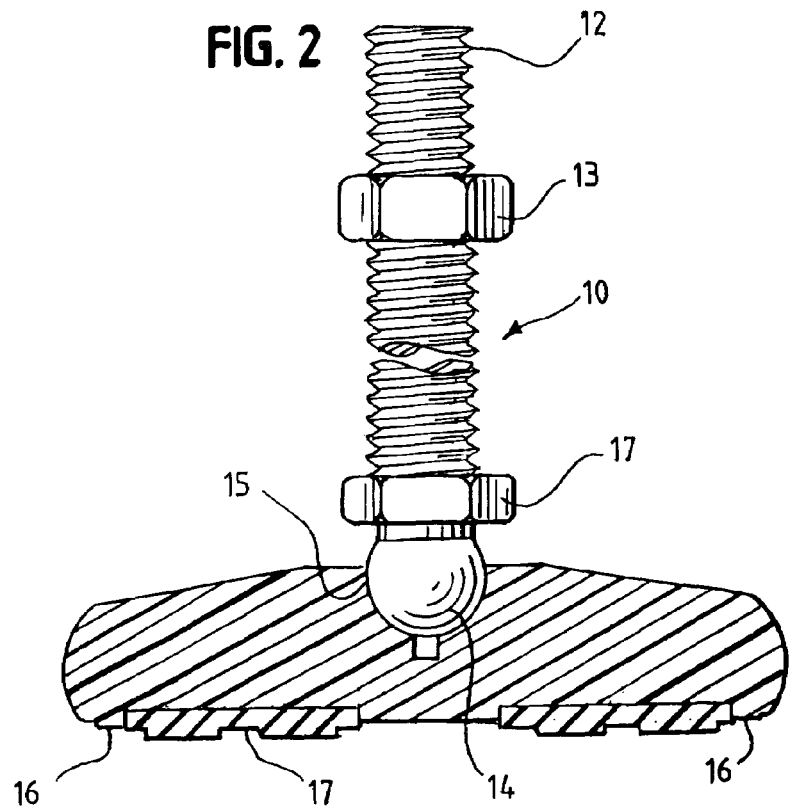
FIG. 2 is a cross-sectional view of an alternative view of the ball socket non-skid leveling mount with a threaded stud in the ball socket of the present invention wherein the view of cross section plane is indicated by B—B of FIG. 3 and FIG. 5.

In FIG. 2, it will be noted that the cross-sectional view indicated by the plane B—B of FIG. 3 and FIG. 5 of leveling mount 10 with a sloping surface 41 comprises a non-skid elastomeric base pad 11, a male circumferential base projection 16 of the rounded circumferential sides 33 of plastic base mount 10 to position the non-skid elastomeric base pad 11 upon the base of the plastic base mount 10. The other designations noted in FIG. 1 apply equally to FIG. 2.

In FIGS. 1, 2 and 8, the indented socket 15 is sized to allow restricted movement of the inserted ball-ended support member to about 15° from the vertical and 360° rotary movement of the leveling mount base.

FIG. 3 is top view of the leveling mount base of FIG. 1 and FIG. 2 wherein the raised circumscribed shoulders 31a and 31b of FIG. 1 upon the surface of the leveling mount base are detailed. The indented socket 15 is within the circumscribed shoulders 31a and 31b. The circumferential flanges 18a and 18b of knock-out covers 20a and 20b are within the respective circumscribed shoulders 31a and 31b. The male rounded circumferential sides 33 of the leveling mount base are shown as circumferential circles and as the circumferential male projecting engagement lip not further described.

Figure 9:
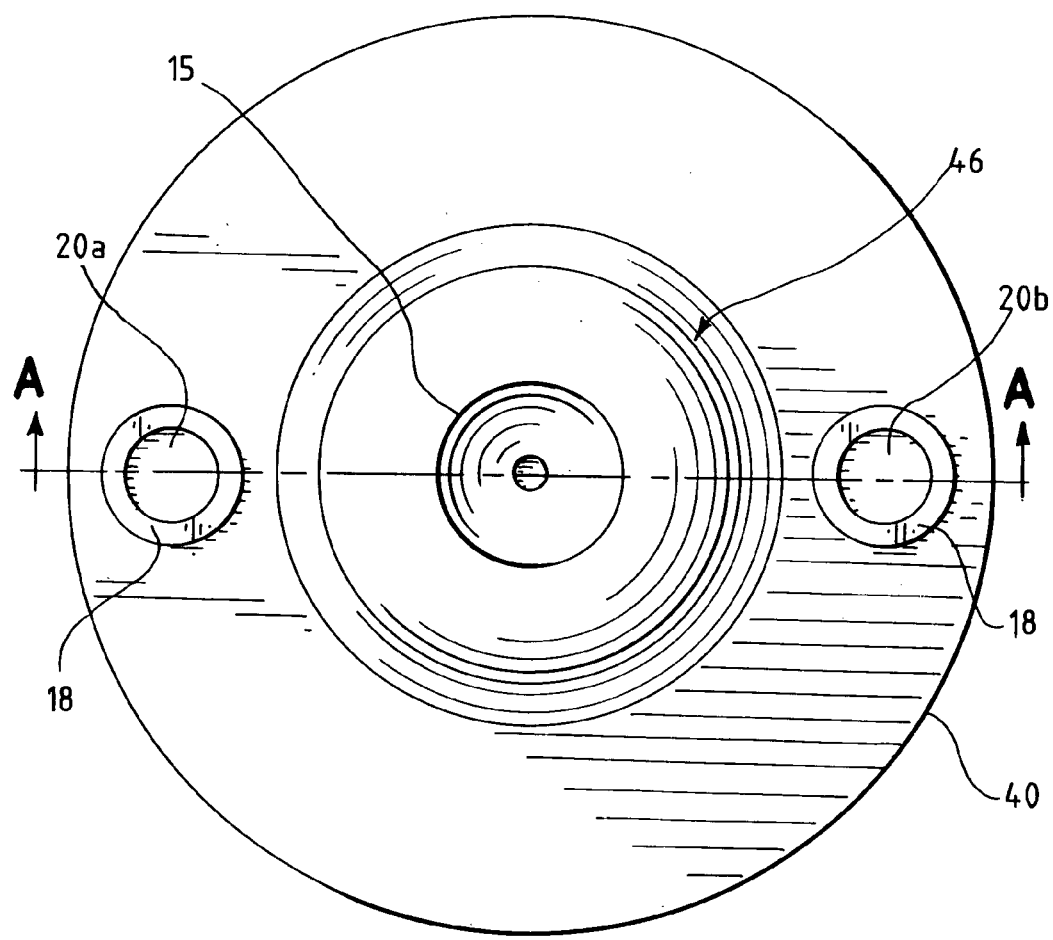
FIG. 9 is a top view of the alternative socket non-skid leveling mount base of FIG. 8 showing the circumferential housing projection around the ball socket and the two knock-out covers located on the leveling mount base upper surface.
Figure 10:
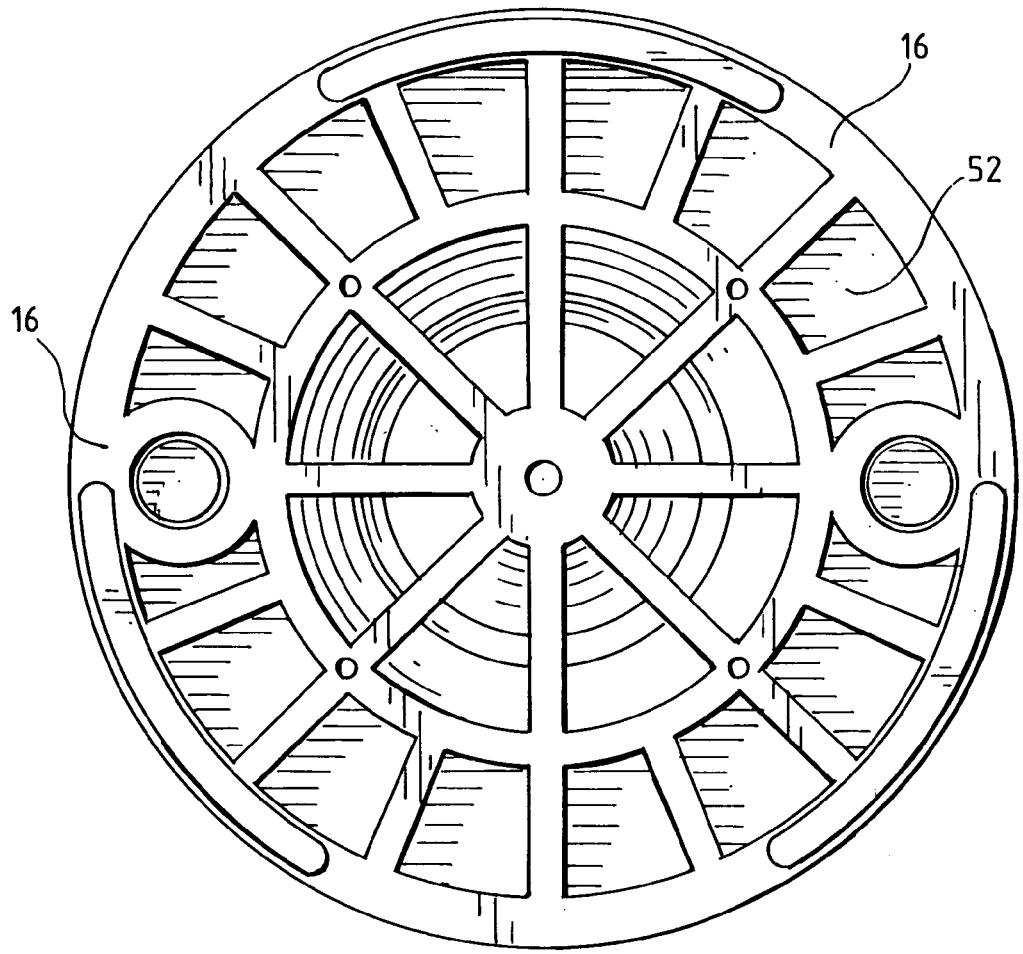
FIG. 10 is a bottom view of the leveling mount base of FIG. 8 showing the male circumferential projection 16 and female recesses 52 which engage male projecting lock segments on the surface of the plastic base pad and the female circumferential sides of the plastic base pad.
Figure 11:
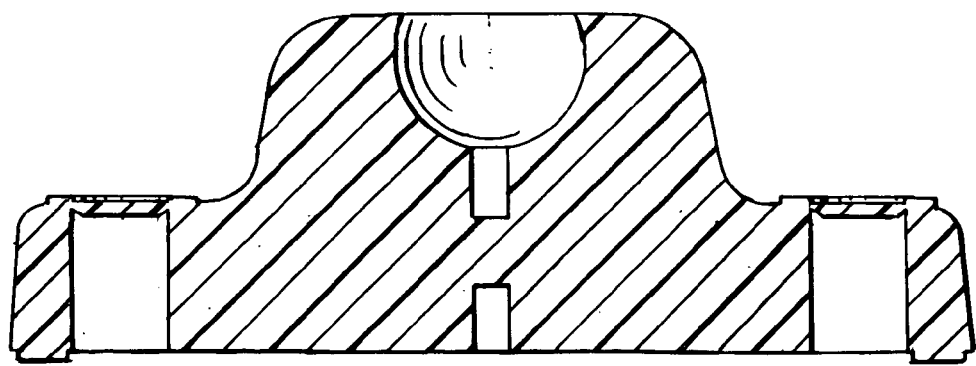
FIG. 11 is a cross-sectional view of the alternative socket non-skid leveling mount base of FIG. 9 along plane A—A of FIG. 10 showing the support structure of the ball socket within the leveling mount base.
Figure 12:
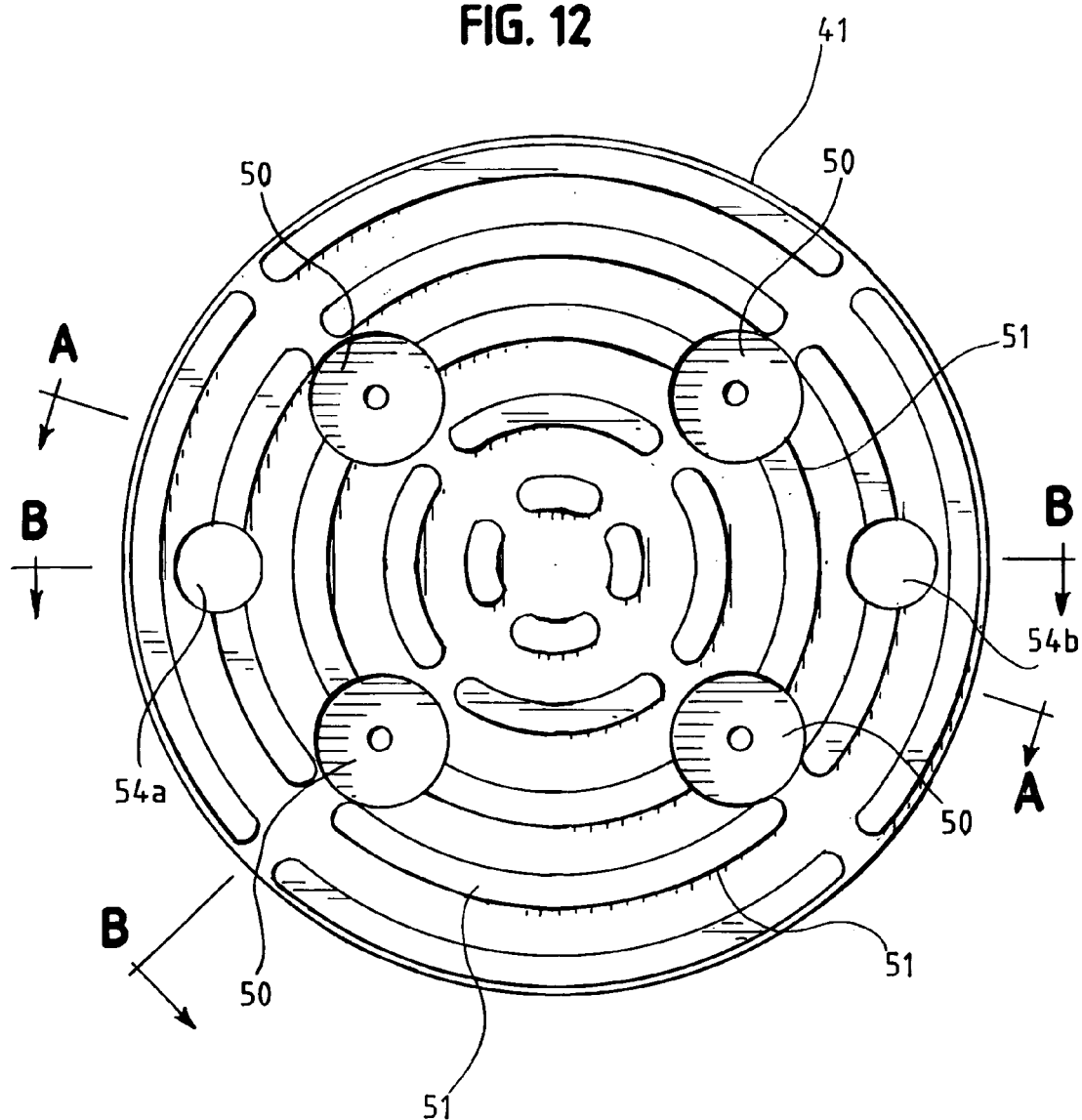
FIG. 12 is a bottom view of the base pad suitable for screw attachment to the alternative leveling mount of FIG. 8 with recesses 50 for placement of washers and screws and openings 54 for lag holes.
Figure 13:
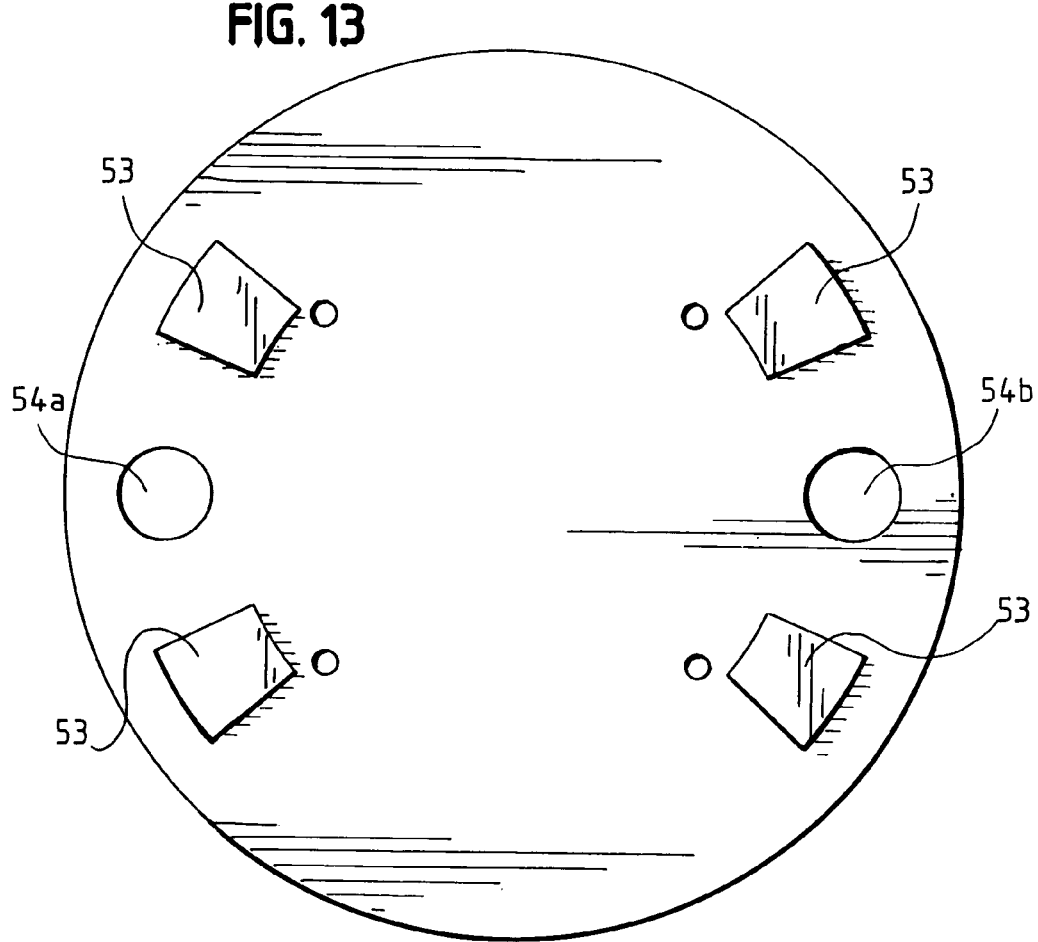
FIG. 13 is a top view of the base pad of FIG. 12 suitable for designated placement and screw attachment to the alternative leveling mount of FIG. 8 showing the male circumferential projections 53 which engage female recesses on the bottom of the leveling mount surface of FIG. 11.
Figure 14A:
FIG. 14 illustrates the cross-sectional views along the plane A—A and plane B—B of FIG. 12 of base pad of FIG. 13.
Figure 14B:
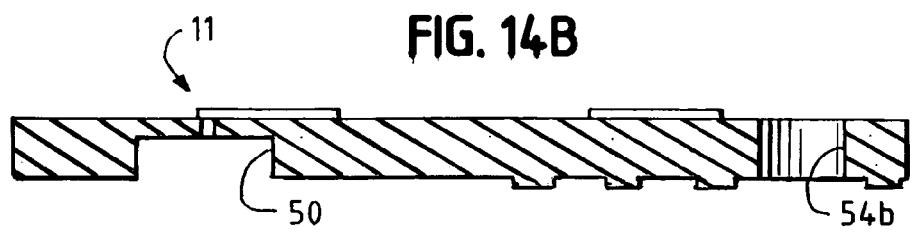

FIG. 4 is a cross sectional view of the leveling mount of FIG. 1 wherein the two lag holes 30(a–b) are shown with the raised flanges 18 on the surface around the lag holes 30 and the lag hole know-out covers 20(a–b). Internal support elements not further described of the leveling mount plastic base 10 of the cross-sectional plane A—A of FIG. 1 are indicated. FIG. 5 is a cross-sectional view of the leveling mount base of FIG. 1 of the cross-sectional plane B—B wherein the sloping surface and rounded sides of the leveling mount base are shown. FIG. 6 is a bottom view of the leveling mount base showing the two lag holes 20(a–b), the three male circumferential raised tabs 34 to provide three point support contact of the base mount. FIG. 6 shows the structural embodiment of the base pad comprising circumferential ribs and cross-members not further described. FIG. 7 is a bottom view of the elastomeric base pad suitable for adhesive attachment to the leveling mount base of FIG. 1. The square designs relate to square male projections on the surface of the elastomeric pads designed to provide resistance against movement of the leveling mount base. The two pad holes 60(a–b) to accommodate attachment of the leveling mount base to the support surface through the base lag holes and the center opening 65 for the center support element are shown. FIG. 8 is a cross-sectional view of an alternate leveling mount base 40 wherein the indented socket 15 is within a circular male projection 46 above the surface of the leveling mount base structure 40. Knock-out covers 20(a–b) are level with the top surface of the leveling mount base 40 and have a measurable circumferential flange 18 for guiding removal of the knock-out covers 20(a–b). The elastomeric base pad 41 has male circumferential projections 53, as shown in FIG. 13, which engage female recesses 52 as shown in FIG. 10 on the bottom of leveling mount 40. FIG. 9 is a top view of the alternate embodiment of FIG. 8 showing the rounded projection 46 housing the indented ball socket 15 for the ball-ended support member 14, and the two knock-out covers 20(a–b) along plane A—A. FIG. 10 is a bottom view of the leveling mount base of FIG. 8. FIG. 11 is a cross-sectional view of FIG. 9 along plane A—A. FIG. 12 is a bottom view of the base pad 41 of FIG. 8 showing the indented circular recesses 50 for insertion of screws and washers for attachment of the base pad 41 to the embodiment of FIG. 8 and the multiple circular surface male projections 51 of the base pad 41 to restrict displacement along the surface of the support. FIG. 13 is a top view of base pad 41 showing the male projections 53 which engage female recesses 52 of the bottom of leveling mount base of FIG. 10 and openings 54 for the lag holes 30(a–b) of plastic base mount 40. FIG. 14 presents cross-sectional views of base pad 41 of FIG. 8 along planes A—A and B—B of FIG. 12.

DETAILED DESCRIPTION

The present invention relates to a unique adjustable leveling mount to be installed on equipment to support and level equipment on an uneven or non-level surface utilizing a ball and socket arrangement. The leveling mount is used to support and level a wide variety of equipment including machine tools, electronic equipment, packaging and printing machines. The mount is constructed of a suitable plastic material with a non-skid cup pad of elastomeric material. The leveling mount engages the mounting stud so that the mounting stud can freely swivel 15° from the vertical to all sides of the centerline through a circular 360° movement in a ball socket. The mounting stud is a threaded metal bar of carbon steel or alloy steel with a ball end which swivels in the leveling mount. Alternatively, a fixed stud already attached to the supported equipment can be engaged with the ball socket of the leveling mount. The ball and socket arrangement allows for a self-leveling adjustment of the leveling mount on an uneven or non-level surface. The ball and socket combination also allows the load to be more evenly distributed about the entire spherical surface of the socket.

The leveling mount utilizes a ball and socket arrangement in combination with an elastomeric base pad to obtain greater stability and location security despite vibratory or oscillatory movement of the equipment during operation, thus providing an added, non-skid attribute to the leveling mount. The term "non-skid" refers to the substantial anchoring of equipment in a specific location upon what can be described as a non-planar surface so that the equipment does not move from its designated position during operation.

The non-skid elastomeric base pad, alternatively termed an adhesive or screwed-on elastomeric pad is of any suitable elastomeric material including nylon, neoprene rubber, butyl rubber, polyurethane rubber, silicone rubber, natural rubber, and any synthetic elastomer suitable for the environmental requirements with resiliency and elasticity. The elastomeric material can be glass-reinforced to aid strength and shock resistance. The base pad is designed to be mounted on the leveling mount plastic base by conventional adhesive means or as a female and a male fitting pad upon the female and male designed leveling mount base wherein male circumferential projections of the base pad fit in place within female and male circumferential indentations and projections in the leveling mount base. The elastomeric feature of the material of the base pad permits the base pad to provide a non-skid resilient property to the leveling mount base and to be removed therefrom. Replacement of the elastomeric base pad is easily obtained by use of simple tools such as by inserting a flat blade between the adhesive surfaces of the support base mount and the base pad or of removing the holding screws. The designed base pad with the female and male fitting projections of the pad and the base mount overcomes the difficulties inherent in any method of placement of the elastomeric base pad upon the leveling mount base. This method of attachment utilizes the elastomer characteristics of resiliency and elasticity to obtain a tight secure fit of the female and male elastomeric pad upon the female and male indented base of the leveling mount. The electrical insulation characteristics of the elastomer cup pad permit electrical insulation of equipment mounted on the leveling mount if such is needed or desired. The design of the elastomer pad permits engineering of the pad dimensions to the required needs of the installation. The thickness and size of the pad can be modified for larger base mount surfaces and thickness to reduce vibration effects upon the mounted equipment. The leveling mount base pad of elastomeric material can be fixed in place upon the plastic mount base with easy placement on the mount base with snap-in place pressure sensitive adhesive or with placement with holding screws and bolts. The pad adhesive can be a pressure-sensitive adhesive or any suitable replacement adhesive for the elastomer pad.

The female and male elements of the plastic base of the leveling mount are designed to accept the elastomer pad as a receiver and support base in that the female and male base elements of the plastic leveling mount base suitably provide female and male circumferential indentations and projections to receive the circumferential locking projections of the elastomeric pad. The plastic mount base is sufficiently holed to form a receiving socket for the ball end of a stud, the said stud being the ball end of a threaded stud or the end of a fixed stud affixed to the mounted equipment. The receiving socket is sufficiently holed to allow the threaded stud with a ball end to swivel 15° from the vertical through 360° in a circular motion. The 15 degrees of movement provided by the receiving socket to the tapped ball stud provides increased stability in that range of deviation from the vertical is restricted but allows sufficient deviation to allow installation of supported equipment upon uneven surfaces that are non-level up to about 15 degrees deviation.

The threaded stud with a ball end is machined from a hardened solid bar of carbon or alloy steel and has a threaded jam nut to raise and lower the height and level of the supported equipment.

The leveling mount base comprises two lag holes in perpendicular alignment to the top and bottom surfaces of the leveling mount base structure through the body of the leveling mount base structure, the two lag holes with knock-out covers. The knock-out covers are level with the top surface of the leveling mount base structure. Alternatively, the knock-out covers can be measurably indented below the top surface of the leveling mount base structure without hindrance of the function of the knock-out covers. It is essential that the top surface of the leveling mount base structure be in parallel alignment with the bottom surface of the leveling mount base structure to reduce open holes, crevices, recesses and cavities between the leveling mount base structure and the support surface. It is also essential that the top surface be a planar surface to provide a tight secure placement means for securing elements such as bolts, screws and washers.

The requirement that the top surface of the leveling mount base be a planar surface in parallel alignment with the bottom surface of the leveling mount base requires that the lag holes and knock-out covers be positioned as elements of shoulders rising above the top surface of a downward sloping surface or, alternatively, the top planar surface of the leveling mount base be in parallel alignment with the bottom planar surface of the leveling mount base.

The leveling mount base has a ball socket formed therein of a suitable plastic material. The socket alternatively is suitably sized to receive either a threaded stud with a ball end or to receive a support stud affixed to the supported equipment. The leveling mount base circumferential female indentation element in conjunction with the circumferential male base projection element provides the female and male mounting for an elastomeric lock-in-place base pad. Alternatively, female recesses of the bottom of the leveling mount base structure engage male projections of the elastomeric base pad surface. The female recesses of the bottom of the leveling mount base structure and the male projections of the elastomeric base pad surface can be of shape and sized to mate with each other in a secure engagement to provide for elastomeric lock-n-place base pad.

The web structure of the leveling mount base provides support to the supported load by transforming the weight of the load to the support surface. The load impressed upon the ball socket has support directly under the ball socket to transmit the force of the supported load directly to the support surface. The perimeter of the leveling mount base has three leveling tabs to provide three point contact surface for the leveling mount to counter the effect of an uneven support surface. The ASTM test method A-370 for compression testing under 10,000 lbs has passed the leveling mount base in compression laboratory testing.

The leveling mount base with an indented socket has female and male engagement means for mounting the elastomeric leveling mount base pad. One engagement means comprises a circumferential female indentation within the leveling mount base structure surface as a female element and a male element comprising a circumferential base lip projection extending around the outer rim of the bottom surface of the leveling mount base structure, the female and male elements forming a structural frame to seat the elastomeric leveling mount base pad. The leveling mount base accordingly comprises a female indentation element within the structure of the bottom surface of the leveling mount base, the female indentation sufficiently depressed to mount the elastomeric pad securely positioned within the male circumferential base projection of the circumferential outer rim of the leveling mount bottom surface, the elastomeric pad held in place by suitable means, including suitable adhesives and other attachment means including bolts, screws and washers.

An alternative female and male engagement means for mounting the elastomeric base pad comprises multiple recesses within the bottom surface of the leveling mount base structure, the recesses sized and positioned to seat multiple male projections on the surface of the elastomeric pad to mount the elastomeric pad upon the bottom surface of the leveling mount base in a secure and fixed position, the elastomeric pad held in place by suitable means, including suitable adhesives and other attachment means including bolts, screws and washers.

The instant invention accordingly comprises, in combination, a leveling mount base with (a) an indented socket, a circumferential female indentation element, a male circumferential projection(s) element, the female circumferential indentation element forming an element of said base mount for easy placement of said base pad upon the leveling mount base, the circumferential male footing projection(s) forming an element of said base mount with easy placement of said base pad upon the leveling mount base, and mating with the female circumferential indentation leveling mount base, said indented socket of said leveling mount base sized to receive an inserted support member for a supported structure, said indented socket sized to permit rotary movement and restrict movement from the vertical of said inserted support member, said circumferential female indentation and circumferential male projection(s) forming a female and male engagement mounting, (b) a ball-ended support member comprising a ball-ended support stud to form a ball and socket joint with said leveling mount base with rotary movement and restricted movement from the vertical, (c) an elastomeric circumferential leveling mount base pad with resiliency and elasticity sized to fit tightly and securely on said leveling mount base as a female and male mounting engaging pad, said leveling mount base with circumferential female indentation and male footing projection engagements sized to seat said leveling mount base pad.

The support stud with a ball end accordingly forms a ball and socket joint with the leveling mount base indented socket. The support stud, alternatively, can be affixed to a supported structure as a supporting part thereof and can be threaded. In such case, a ball end is not required of the equipment support stud. The elastomeric circumferential leveling mount base pad can be of any elastomeric material such as nylon neoprene rubber, butyl rubber, polyurethane rubber, silicon rubber, natural rubber, and any synthetic rubber. The elastomeric material can be glass reinforced to aid strength and shock resistance. The indented socket is sized to allow the inserted ball-ended stud movement of 15° from the vertical and a 360° rotary movement of the leveling mount base. The ball-ended support stud is threaded to receive a threaded nut to raise and lower the supported structure. The leveling mount base pad of elastomeric material can be fixed in place upon the plastic mount base with easy placement upon the base mount with an adhesive or snap-in-place pressure sensitive adhesive or with placement with holding screws and is removable by inserting a flat blade between the adhesive surfaces or by removing the holding screws. Alternatively, the indented socket of said leveling mount base can be threaded to receive a threaded or non-threaded support stud without a ball end affixed to the supported structure.

What is claimed is:

1. A leveling mount comprising in combination:
   (a) a leveling mount base with an indented socket, a female and male engagement means for an elastomeric leveling mount base pad comprising a circumferential female indentation element and a male projection element, said indented socket sized to receive an inserted support member, for a supported structure as a means to permit rotary movement and restrict movement from the vertical of said inserted support member and means comprising said leveling mount base configured to have parallel outer surfaces and attachment elements for securing said leveling mount to the support surface to reduce to a minimum the presence of open holes, crevices, recesses and cavities in the juncture of said leveling mount base with the support surface, wherein said indented socket is sized to allow a restricted movement of an inserted support member to about 15° from the vertical and 360° rotary movement of the leveling mount base, said female circumferential indentation element and said male projection element forming a female and male engagement mounting;
   (b) a support member element comprising a support stud sized to be inserted into said indented socket of said leveling mount base element to form a joint with rotary movement and restricted movement from the vertical;
   (c) an elastomeric circumferential leveling mount base pad with resiliency and elasticity sized to fit tightly and securely on said leveling mount base by said engagement means comprising said female indentation element and said male projection element;
   (d) a suitable number of lag holes with knock-out covers over said lag holes in said leveling mount base, said lag holes in perpendicular alignment to parallel top and bottom surfaces of said leveling mount base to provide a means of securing said leveling mount base to a support surface.

2. The leveling mount of claim 1 wherein said means for securing said leveling mount to said support surface comprises said configured parallel outer surfaces of said leveling mount base in combination with said lag holes with knock-out covers in perpendicular alignment to said top and bottom surfaces and securing elements including bolts, screws and washers.

3. The leveling mount base of claim 1 wherein said female indentation element of said female and male engagement means for an elastomeric leveling mount base pad comprises a female indentation within the structure of the bottom surface of said leveling mount base, said female indentation sufficiently depressed to mount said elastomeric pad securely positioned within the male circumferential base lip projection of the circumferential outer rim of said leveling mount base to permit attachment of said pad to said leveling mount base by suitable means.

4. The leveling mount base of claim 1 wherein said female indentation element of said female and male engagement means for an elastomeric leveling mount base pad comprises multiple recesses within the structure of the bottom surface of said leveling mount base, said recesses sized and positioned to receive multiple male projections on the top surface of said elastomeric pad to mount said elastomeric pad upon the bottom surface of said leveling mount base in a secure and fixed position to permit attachment of said pad to said leveling mount base by suitable means.

5. The leveling mount of claim 1 wherein said support member comprises a ball-ended support stud to form a ball and socket joint with the leveling mount indented socket.

6. The leveling mount of claim 1 wherein said support socket stud comprises a support stud affixed to said supported structure.

7. The leveling mount of claim 1 wherein said elastomeric leveling mount base pad is of a material selected from the group consisting of nylon, neoprene rubber, butyl rubber, polyurethane rubber, silicone rubber, natural rubber and any synthetic elastomer with resiliency and elasticity.

8. The elastomeric leveling mount base pad of claim 7 wherein said elastomeric base pad material is glass reinforced to aid strength and shock resistance.

9. The leveling mount of claim 1 wherein said support member element comprises a ball ended support stud threaded to receive a threaded nut to raise and lower the supported structure.

10. The leveling mount of claim 1 wherein said elastomeric leveling mount base pad is a lock-in-place pad for easy placement upon said base mount, is held in place by suitable means including an adhesive and holding screws and is removable by insertion of a flat blade between adhesive surfaces and by removal of holding screws.

11. The leveling mount base of claim 1 wherein said inserted support stud comprises a fixed stud of supported equipment.

12. The leveling mount base of claim 11 wherein said inserted support member comprises a fixed stud member of supported equipment wherein said inserted support member in said indented socket of said leveling mount base is threaded.

* * * * *